June 8, 1965 D. W. KELLIHER 3,188,080
RECORD MEDIUM STACKING GUIDE MEANS
Filed Sept. 19, 1963 2 Sheets-Sheet 1

INVENTOR
DANIEL W. KELLIHER
BY David Teschner
ATTORNEY

June 8, 1965 D. W. KELLIHER 3,188,080

RECORD MEDIUM STACKING GUIDE MEANS

Filed Sept. 19, 1963 2 Sheets-Sheet 2

United States Patent Office 3,188,080
Patented June 8, 1965

3,188,080

RECORD MEDIUM STACKING GUIDE MEANS

Daniel W. Kelliher, Falls Church, Va., assignor to Sperry Rand Corporation, New York, N.Y., a corporation of Delaware Filed Sept. 19, 1963, Ser. No. 310,068
4 Claims. (Cl. 270—61)

This invention relates to record medium driving systems, and to guide means for use in such systems, and is more particularly directed to an improved apparatus for use in a high speed printer employing fan-folded record material for guiding such record material to insure proper stacking thereof subsequent to a printing operation.

Many paper driving systems and printing devices known to the prior art employ fan-folded record material such as paper or stiff cardboard. In general, these devices are characterized by driving means such as a drive sprocket adapted to move such record materials from an input stack, past a printing location, to a fan-folded output stack. Known apparatuses, of the type described, ordinarily employ an immovable guide plate disposed adjacent one side of the record material to guide the folding of the record material into the output fan-folded stack.

Guide plates of this type, namely those adjacent one side of the output paper stack, are generally adequate in those installations wherein the fan-folded record material moves at a constant speed. In various applications, however, and particularly in high speed printing applications of the type employed in digital or other computing devices, the record material is caused to move at a continuously varying speed. Thus, in high speed printers, it has been required that the record material pass the printing station at a speed which is constantly being changed due to the printing speed and the various spacing requirements. This range of speed, depending upon whether printing operations or paper advancing operations are to take place, may be in the range of 100 inches per minute for single spacing and printing to 1,200 inches per minute when a great deal of line spacing is required.

This wide possible variation in record material speed causes the record material to fall toward the output stack in an erratic manner. The immovable guide plate, mentioned above, which has been utilized in the past, is ordinarily designed to abut a creased edge of the stack so as to guide the record material in fan-folding into the output stack and this guiding method is, in fact, satisfactory only when a rhythmic action, induced by the rate of fall and the spacing of the creases in the record material, is set up in the paper to aid in its stacking. It has been found, however, that when these known types of record material stacking guides are employed in variable speed record material drive systems of the type described, the paper tends to misfold and pile up in a disorderly fashion.

Additionally, when multi-layer fan-folded forms are employed which layers may be of heavy paper or cardboard, the stiffness is such that the forms tend to resist the folding by such edge guiding devices as described above, and further add to the disorder of the output stack.

A solution to the problems described above was presented in the patent to A. Blain, No. 2,906,527, issued September 29, 1959. In the cited device, a plurality of weights supported by individual wires or strands are hung in such a manner as to permit the weights to rest upon the fan-fold form as it comes off the vertical run of the printing and paper advancing device. These weights tended to provide sufficient pressure against the form to cause the paper to take on a curvature sufficient to make the paper fold at its preformed creases. In the Blain device, two such banks of weights were required; a first bank for folding in the forward direction and a second bank for folding in the rearward direction. This device of Blain, however, introduced the following limitations. The position of the weights with respect to the stacking fan-fold must constantly be adjusted, that is, as the stack of fan-folded paper got higher, the weights would have to be constantly lifted in order that they permitted the fan-folded material to take on the proper curvature. Automatic equipment had to be provided to permit this constant movement of the weights or the device had to be adjusted by hand which required constant operator attention.

The device of the present invention obviates the difficulties inherent in the prior art devices including that of Blain. In this device, a paper stacking guide is provided in close proximity with the vertical run of the printer and paper advancing device in such a manner that it continually bears upon the upper surface of the fan-fold paper placing sufficient curvature in the length of paper between the end of the vertical run and the top of the paper stack to permit the fan-fold of the material to fold on its proper preformed creases. This device serves to break up vertical forces which operate along the length of the paper tending to keep it moving in a straight line past the desired stack. The force impressed by the stacking weight is such that it directs the force in the proper direction to tend to cause the paper to bend along its preformed creases and neatly form a fan-fold output stack. It is, therefore, an object of this invention to provide an improved form of paper stacking guide means.

It is another object of this invention to provide an improved form of paper stacking guide means which is simple to construct and which may be placed upon the paper handling or printing device without the requirement for adjustability.

It is a further object of this invention to provide a novel form of paper stacking guide means which is operable with fan-folded record mediums which is operable regardless of the thickness of the fan-folded form employed.

Further objects and features of the invention will be pointed out in the following description and claims, and illustrated in the accompanying drawings which disclose, by way of example, the principles of the invention and the best mode which has been contemplated for carrying it out.

In the drawings.

Similar elements are given similar reference characters in each of the respective figures.

Figure 1:
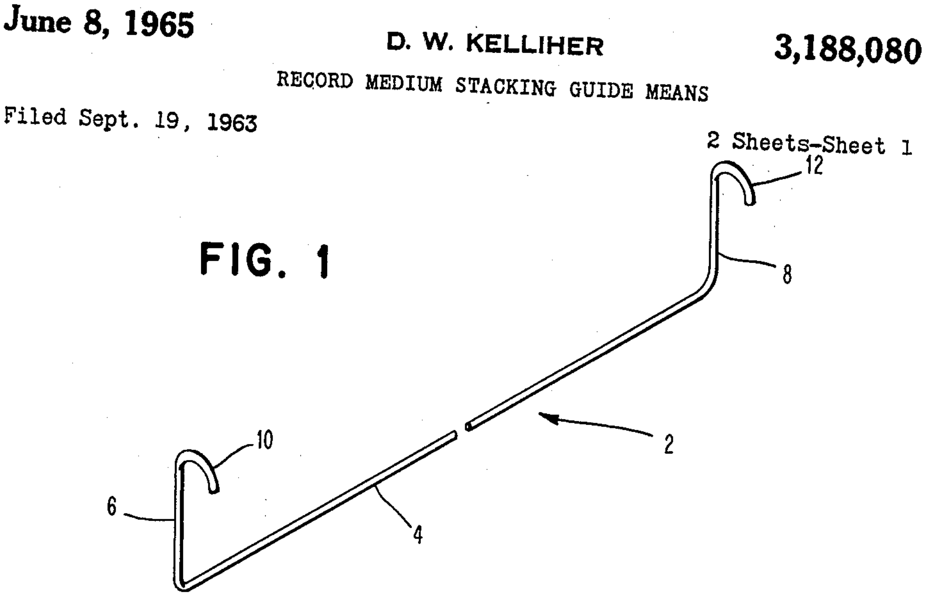
FIGURE 1 illustrates a paper stacking guide means constructed in accordance with the concepts of this invention.

Referring now to FIGURE 1, a paper stacking guide means 2 constructed in accordance with the basic concepts of the invention is shown. The paper stacking guide means 2 is formed with a transverse member 4 which is bent at its ends 6 and 8 perpendicular to the transverse member 4. Each of the ends 6 and 8 are further bent in the form of hooks 10 and 12, respectively. The hooks 10 and 12 are formed so as to lie in the same plane with the side portions 6 and 8, respectively. The paper stacking guide means may be constructed for example from a material such as ⅛ inch steel rod. The transverse member 4 may have a length of approximately 22 inches whereas the length of the ends 6 and 8 from their point of contact with the transverse member 4 to the top of the hook portion may be approximately 4¼ inches long. The free end of the hooks 10 and 12 may be approximately 1 inch in length. It should be understood that these dimensions are given for exemplary purposes and are not intended to limit the scope of the invention in any way, in that the paper stacking guide means may be formed in any dimensions which are necessary for a particular application.

Figure 2:
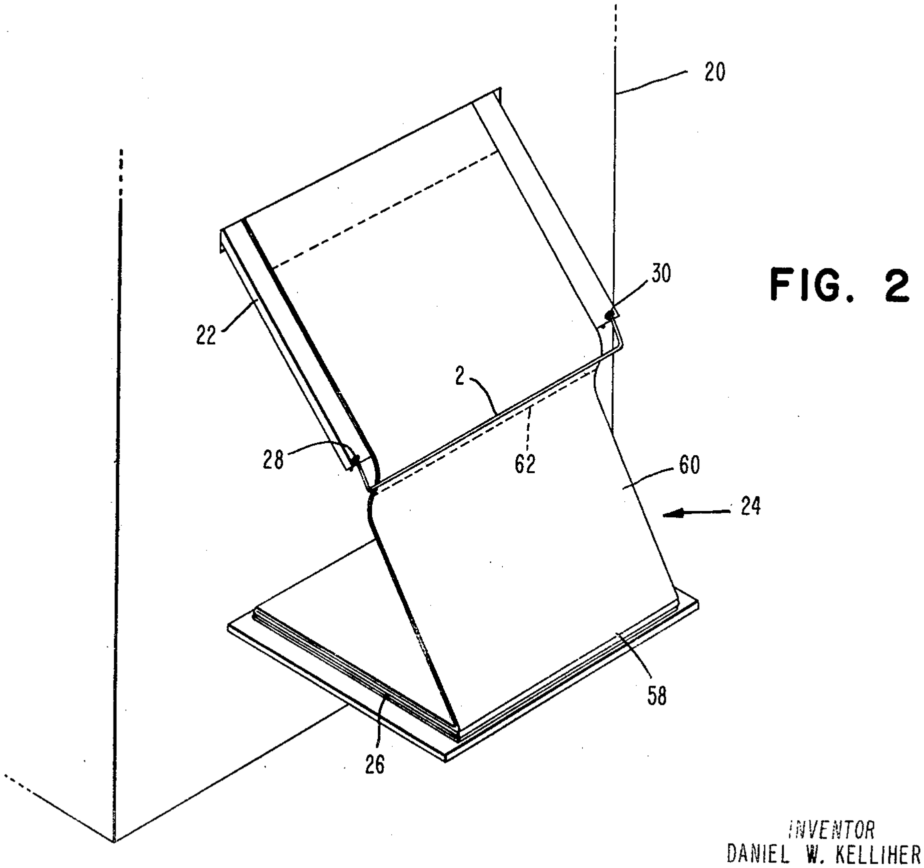
FIGURE 2 is a front perspective view of a printing device with a paper stacking guide means of the type described in this invention installed.

Turning now to FIGURE 2, the manner of installation and use of the paper stacking guide means of FIGURE 1 are better illustrated. FIGURE 2 shows a portion of the printer paper advancing cabinet 20 showing the bottom portion of the exit chute 22. As will be described later with reference to FIGURE 3, a fan-folded record material is moved from an input stack through a print station down an inclined exit chute 22 to a fan-folded output stack 26. A pair of apertures 28 and 30 are located on either side of the exit chut 22 and are adapted to receive the hooked ends 12 and 10, respectively, of the paper stacking guide means 2. Placed in this position, the transverse member 4 lies across the entire width of the record medium 24. The record medium 24 is made to pass down the exit chute 22 and under the transverse member 4 of the record stacking guide means 2. Due to the pivotal mounting of the hook ends 10 and 12 with the apertures 30 and 28, respectively, of the exit chute, the transverse member 4 is permitted to take a number of relative positions along the semi-circular arc, the center of which lies along the line connecting the apertures 10 and 12. This flexibility of position of the transverse member 4 permits the guide to operate upon fan-fold record materials despite variations in their thickness and in their relative position with respect to the exit chute 22.

The transverse member 4 tends to produce a force against the upper surface of the record medium 24 tending to place a curvature in the otherwise straight line movement of the medium 24.

Figure 3:
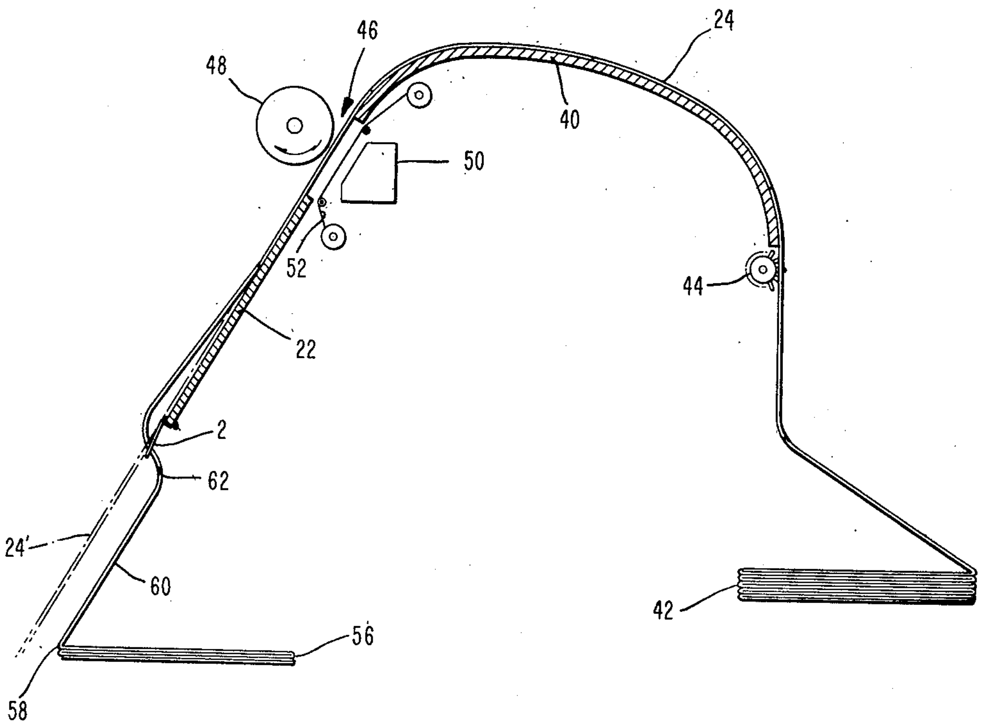
FIGURE 3 is a schematic side view of the printing device of FIGURE 2 illustrating in more detail the manner in which the paper stacking device of the invention operates.

Referring now to FIGURE 3, a side view of a paper advancing and printing means which employs the paper stacking guide means of the instant invention is shown. This printing and paper advancing device comprises an upper paper guide 40 over which the record medium 24 is passed. The record medium 24 is moved from an input stack 42 by means of a sprocket wheel 44. As the record medium 24 advances over the upper paper guide 40, it reaches the printing station 46 consisting of a print cylinder 48, a print head assembly 50 and an inking ribbon 52. The record medium then proceeds over an inclined exit chute 22 through the stacking guide means 2 to an output fan-folded stack 56. The print cylinder 48 and the sprocket wheel 44 are driven by means (not shown).

Due to the force imparted to the record medium 24 by means of the sprocket wheel 44, the force of gravity acting on the record medium as it falls towards the output stack 56 and the natural stiffness of the multi-layer fan-folded material, the paper stack would tend to have a line of movement as shown by the phantom lines 24′ in the absence of record material stacking guide means. That is, the record material would continue in a straight line direction due to the forces imparted to it in moving but would fail to form the desired output fan-folded stack. In order to permit the record medium to be properly fan-folded in the output stack 56, the record medium stacking guide means 2 is placed closely adjacent the lower edge of the exit chute 22 and is positioned so that the record material 24 must pass below the transverse member 4. In this manner, a slight force or pressure is introduced at the upper surface of the record material 24 which causes it to move away from the natural unimpeded direction as shown by the dashed line 24′. Due to this disturbing of its natural line of movement, the record material will then be caused to bend along the preformed creases such as 58. When the sheet 60 between the perforations 58 and 62 have been placed atop the stack 56, the curvature introduced by means of the record medium stacking guide 2 and the natural stiffness of the record material will cause the record material to bend along the preformed creases 60 and continue the stacking operation. As long as the record material can be kept from moving along the straight line positions shown by the dashed lines 24′, sufficient force cannot be produced in the record material to prevent it from being folded along its preformed creases such as 58 and 62.

In that the record medium stacking guide means 2 is placed in close proximity to the lower edge of the exit chute 22, the guide means 2 is effective for large stacks of record material up until the point that the stack is close to the lower edge of the exit chute 22 at which time the stack must be unloaded from the printing device.

While there has been shown and described and pointed out the fundamental novel features of the invention as applied to the preferred embodiment, it should be understood that various omissions and substitutions and changes of the form and details of the device illustrated and its operation may be made by those skilled in the art, without departing from the spirit of the invention.

The embodiments of the invention in which an exclusive property or privilege is claimed are defined as follows:

1. In a record medium driving system of the type wherein an elongated length of a record medium is caused to move across an exit chute after which said record medium is folded into a stack the improvement which comprises a folding bar disposed transverse to the direction of movement of said record medium across said exit chute, said bar having a first portion extending in said transverse direction and a pair of second members connected to said first member, extending away from said exit chute, said second members being pivotally linked to said exit chute, said record medium being passed between said exit chute and said folding bar whereby said folding bar applies a pressure to the surface of said record medium causing said record medium to fold along the perforations in said record medium.

2. In a printing device of the type wherein elongated record material is moved from a supply stack of fan-folded record material past a printing station whereafter said record material is moved across an exit chute from said printing station and is fan-folded into an output stack, the improvement which comprises stacking guide means disposed adjacent said exit chute, said stacking guide means including a first member and a pair of second members, said second members extending in a direction parallel with the sides of said exit chute and each connected to said first member at a different end to position said first member transverse to the sides of said exit chute; and means to pivotally mount said second means to said exit chute to permit said record material to pass across said exit chute, below said first member and between said second members whereby said first member applies a pressure to the surface of said record material causing said material to bend at its preformed creases and form a uniform fan-folded output stack.

3. In a printing device of the type wherein elongated record material is moved from a supply stack of fan-folded record material past a printing station whereafter said record material is moved across an exit chute from said printing station and is fan-folded into an output stack, the improvement which comprises stacking guide means disposed adjacent said exit chute, said stacking guide means including a first member and a pair of second members, said second members extending in a direction parallel with the sides of said exit chute and each connected to said first member at a different end to position said first member transverse to the sides of said exit chute; said second members being bent in the form of a hook at their ends remote from said first member; a pair of apertures adjacent the edges of said exit chute, said hook ends of said second members being placed in said apertures to permit said stacking guide means to freely move in a prescribed arc with respect to said exit chute to permit said record material to pass along said exit chute, below said first member and between said second members whereby said first member applies a pressure to the surface of said record material causing said material to bend at its preformed creases and form a uniform fan-folded output stack.

4. In a printing device of the type wherein elongated record material is moved from a supply stack of fan-folded record material past a printing station whereafter said record material is moved across an exit chute from said printing station and is fan-folded into an output stack, the improvement which comprises stacking guide means disposed adjacent said exit chute, said stacking guide means comprising a first portion and second portions perpendicular to said first portion and parallel with the sides of said exit chute, said second portions being formed at their remote ends in the shape of a hook; a pair of apertures in said exit chute to accept the hooked ends of said second portions of said stacking guide means to permit said stacking guide means to freely move in a prescribed arc with respect to said exit chute with said first portion extending transverse to the sides of said exit chute, the position of said stacking guide means permitting said record material to pass across said exit chute, below said first portion and between said second portions of said stacking guide means whereby said first portion applies a pressure to the surface of said record material causing said material to bend at its preformed creases and form a uniform fan-folded output stack.

References Cited by the Examiner

UNITED STATES PATENTS

| | | | |
|---|---|---|---|
| 2,334,283 | 11/43 | Pfeiffer | 270—52.5 |
| 2,440,302 | 4/48 | Sherman | 270—52.5 |
| 2,906,527 | 9/59 | Blain | 270—61 |

EUGENE R. CAPOZIO, *Primary Examiner.*